(12) United States Patent
Albuainain

(10) Patent No.: US 10,334,795 B2
(45) Date of Patent: Jul. 2, 2019

(54) UTILIZATION OF IRRIGATION WATER SAVER

(71) Applicant: Mubarak Abdulla Mubarak Albuainain, Abu Dhabi (AE)

(72) Inventor: Mubarak Abdulla Mubarak Albuainain, Abu Dhabi (AE)

(*) Notice: Subject to any disclaimer, the term of this patent is extended or adjusted under 35 U.S.C. 154(b) by 0 days.

(21) Appl. No.: 15/986,903

(22) Filed: May 23, 2018

(65) Prior Publication Data

US 2018/0338438 A1    Nov. 29, 2018

Related U.S. Application Data

(63) Continuation of application No. PCT/IB2018/053593, filed on May 22, 2018.

(51) Int. Cl.
*A01G 29/00* (2006.01)
*C05G 3/04* (2006.01)
*C05F 11/00* (2006.01)

(52) U.S. Cl.
CPC .............. *A01G 29/00* (2013.01); *C05F 11/00* (2013.01); *C05G 3/04* (2013.01)

(58) Field of Classification Search
CPC . A01G 29/00; C05G 3/00; C05G 3/04; C05G 3/0017; C05G 3/0052
USPC ..................................... 47/48.5, 79
See application file for complete search history.

(56) References Cited

U.S. PATENT DOCUMENTS

| 2,817,956 | A | * | 12/1957 | Young | A01G 25/06 405/45 |
| 2,931,140 | A | * | 4/1960 | Laffier | A01C 21/00 206/0.5 |
| 5,533,300 | A | * | 7/1996 | Kesler | A01G 29/00 47/48.5 |

(Continued)

FOREIGN PATENT DOCUMENTS

| AU | 2016202365 A1 | 5/2016 |
| CN | 102599024 A | 7/2012 |
| GC | 0004596 | 8/2014 |

(Continued)

OTHER PUBLICATIONS

International Search Report dated Sep. 6, 2018 relating to PCT Patent Application No. PCT/IB2018/053593, 5 pages.

(Continued)

*Primary Examiner* — Peter M Poon
*Assistant Examiner* — Danielle A Clerkley
(74) *Attorney, Agent, or Firm* — Stinson LLP

(57) ABSTRACT

A method to reduce the amount of irrigation water wherein the device is made of combusted product in cylinder shape (the device) made of biomass at 4 cm./6 cm./8 cm. diameter to be inserted in various depths, sizes/length under the source of water irrigation in proximity to tree or plant and in different numbers according to the season. The device has ability to absorb and store irrigation water in high capacity up to 300% in higher quantity than soil ground making it as sustainable source to supply the roots of a tree or plant by water in areas which suffer from shortfall of rain, with poor type of soil and depletion of underground water reservoir. The device will absorb water and make the surrounding soil constantly moisture and wet by allowing diffusion of water from device.

4 Claims, 3 Drawing Sheets

(56) References Cited

U.S. PATENT DOCUMENTS

2010/0084491 A1* 4/2010 Williams ............ A01C 23/042
                                                    239/276

FOREIGN PATENT DOCUMENTS

| JP | 2000032840 A | 2/2000 |
| JP | 2003102278 A | 4/2003 |
| JP | 2004211373 A | 7/2004 |
| WO | 91/13541 | 9/1991 |
| WO | 2010/041566 A1 | 4/2010 |

OTHER PUBLICATIONS

Written Opinion dated Sep. 6, 2018 relating to PCT Patent Application No. PCT/IB2018/053593, 4 pages.

* cited by examiner

UTILIZATION OF IRRIGATION WATER SAVER

CROSS REFERENCE TO RELATED APPLICATION

This application claims priority from Cooperation Council for the Arab States of the Gulf (GCC) Application No. GC2017-33475, filed May 25, 2017. The entire contents of the above-identified application are expressly incorporated herein by reference in their entirety.

BACKGROUND

The device as prior art is compressed and combusted cylinder made of crushed, mixed and dried to reduce the humidity percentage to 8-12 degrees biomass treated under temperature not less than 300 degrees. The natural lignin in biomass is liberated with wood fiber due to combustion and high temperature.

Lignin serves as glue and holds the wood particles (raw materials) together in a new form of high density cylinder in a round or square shape at diameter of 8 cm./6 cm./4 cm. and hallow inside to be used as saver for irrigation water by the applicant as in a patent no. GC0004596 granted by Patent Office of the Cooperation Council for the Arab States of the Gulf at 1 Jan. 2017.

SUMMARY

The defect on the prior art is fall short of method of the device wherein the prior art it gives the process and the steps of manufacturing the product by crushing, mixing, drying and combusting in cylinder shape and hallow inside in different sizes only but not the utilization and the method of using the device itself to reduce the amount of water used in irrigation.

A method to reduce the amount of water used in irrigation of a tree/plant, wherein the device of irrigation water saver (the device) is made of crushed, mixed at calculated rate according to the agriculture season, dried and pressed biomass in cylinder shape, hallow inside in different sizes is free of any chemicals The method to reduce the amount of water used in irrigation wherein the device has the ability to absorb the irrigation water in higher capacity than the soil ground which make the device sustainable source of irrigation water in poor sandy soil, dry and hot weather areas, countries suffer from shortfall of rain and depletion of underground reservoir and drought & dissertation. The device will help reduce the amount of irrigation water consumption between 20% to 30%.

The method to reduce the amount of water used in irrigation wherein the device has high Water Holding Capacity up to 300% and holds the irrigation water for long time; the device will absorb the irrigation water gradually slowly. The device having greater water absorbing ability than the sandy soil thereby limiting the loss of water into the ground and maintaining a degree of moisture to the surrounding area under in proximity to said tree/plant especially in poor sandy soil.

The method to reduce the amount of water used in irrigation wherein the device when fully absorbed the water then it will allow diffusion of water which make soil surrounding the device under and in proximity to said tree/plant will remain wet and moisture around the clock for long time, therefore the roots will be supplied and fed by water from the device and wet surrounding area helping the said tree/plant to grow.

The device will be placed in various ranges of depths and in different sizes/length and numbers according to the age, size of the tree/plant and season under the source of irrigation water and in proximity to said tree/plant.

BRIEF DESCRIPTION OF THE DRAWINGS

FIG. 1.1 shows the depth;
FIG. 1.2 shows the size/length;
FIG. 1.3 shows the drippers.
FIG. 2.1 shows the depth;
FIG. 2.2 shows the size/length;
FIG. 2.3 shows the drippers.
FIG. 3.1 shows the depth;
FIG. 3.2 shows the size/length;
FIG. 3.3 shows the drippers.

DETAILED DESCRIPTION

Figure 1:
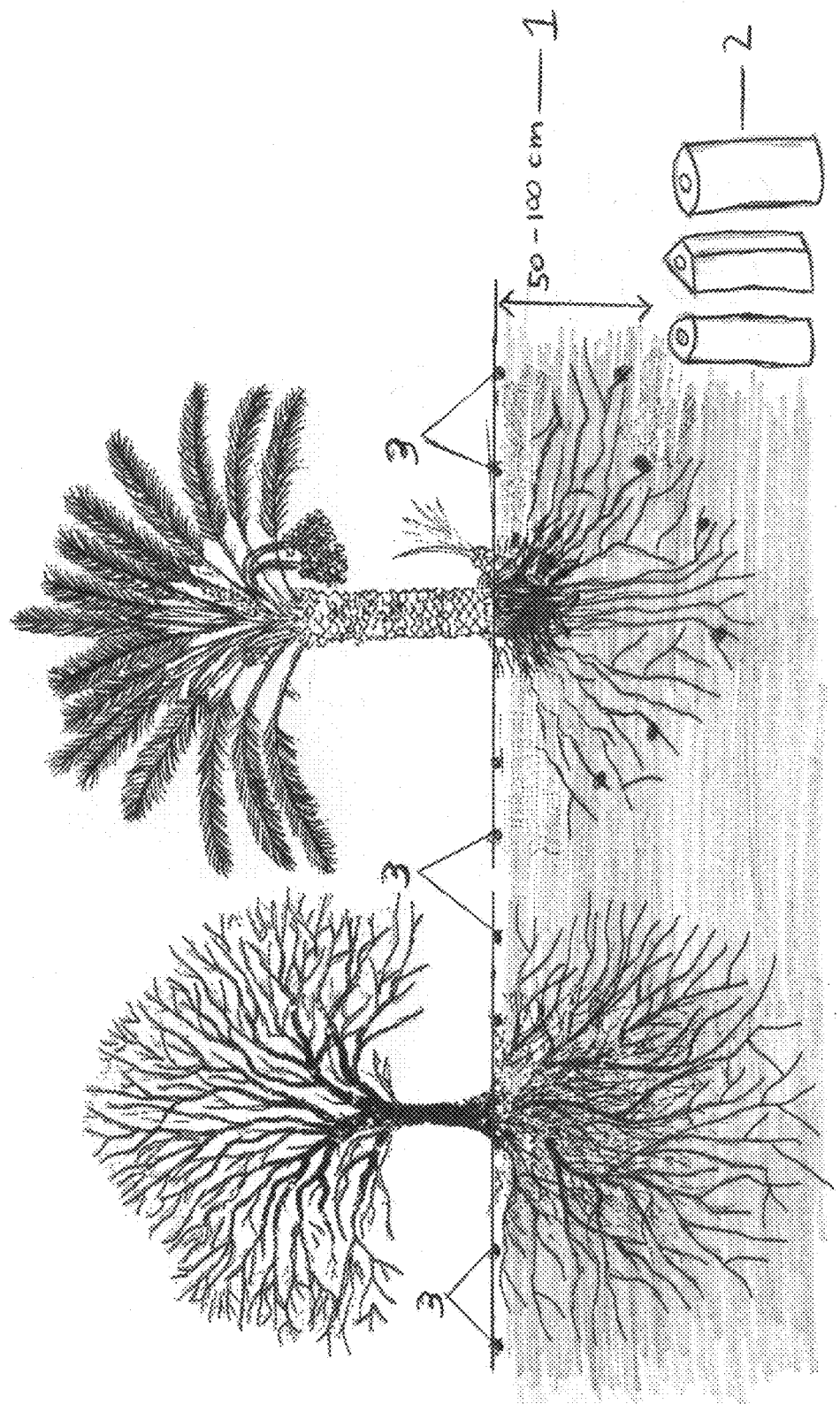
FIG. 1 shows the large trees.
Figure 2:
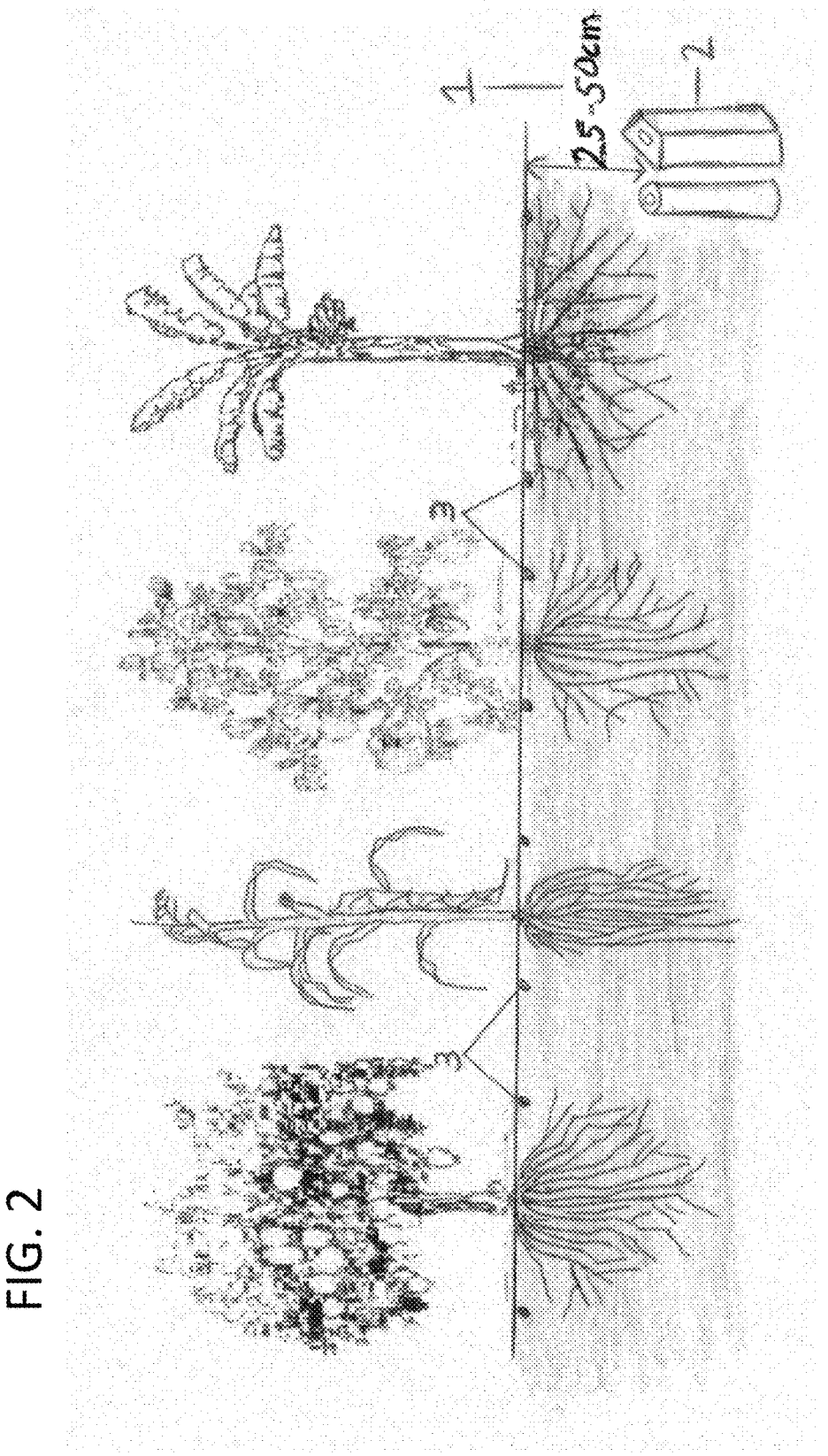
FIG. 2 shows the medium trees.
Figure 3:
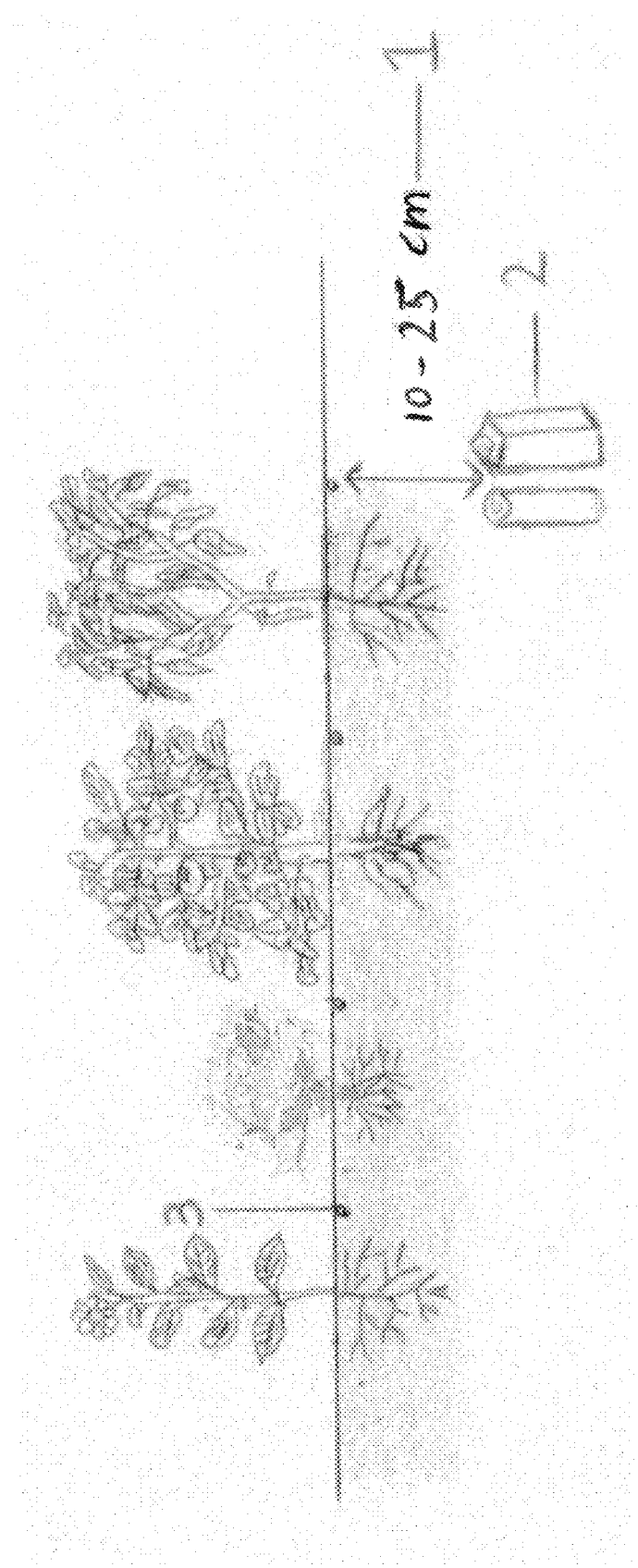
FIG. 3 shows the plants.

A method to reduce the amount of irrigation water wherein the device will help to save water irrigation and reduce consumption level by 20% to 30%.

The manufacturing operation of the device involves a number of stages in order to have a combusted cylinder made of mixed biomass as a final result and to be used in agricultural field.

The device has a Water Holding Capacity (WHC) up to 300% as approved by the analysis result carried out by the United Arab Emirates Ministry of Environment & Water that can make the surrounding soil of the device wet and humid for extended periods of time despite poor soil's type, high temperatures and quick evaporation especially in the summer time, drought period and shortage of rainfalls, and that is achieved by inserting the device vertically into the soil under the source of irrigation water.

The method to use the device (Irrigation Water Saver) to reduce the irrigation water amount for large trees, medium trees and plants by placing and inserting the device vertically under the source of irrigation water and in proximity to tree/plant:

Large trees within the range depth of 50 cm to 100 cm;
Medium trees (i.e. cotton, corn, pomegranate, banana, apple, orange, grape . . . etc) within the range depth of 25 cm to 50 cm;
Plants (i.e. lettuce, cabbage, tobacco, beans, peas, eggplant, chili, tomato . . . etc) within the range depth of 10 cm to 25 cm.

The size/length of the device is according to the size and age of the tree/plant:

Large trees, the size of the device is within the range of 25 cm or longer;
Medium trees within the range of 15 cm to 25 cm;
Plants within the range of 5 cm to 10 cm.

The numbers of the device required is according to the size, age of the tree/plant and the season:

Large trees at a rate of 2 devices in winter and a minimum rate of 4 devices in summer;
Medium trees at a rate of 1 device in winter and a minimum rate of 2 devices in summer;
Plants at a minimum rate of 1 device in season.

The device has the ability to absorb irrigation water when it is inserted vertically under the source of irrigation water, where the device will begin absorbing the water slowly and gradually up to the rate of 300% and holds the water for long time, then will permeate water to said tree/plant through sandy soil when a daily ration of irrigation stops and the sand surrounding the device starts to get dry, which make the surrounding area of the device under said the tree/plant constantly wet and moist and helps to feed and grow these roots.

The method to reduce the amount used in irrigation water wherein the device will minimize the lost of irrigation water into the ground specially in poor sandy soil and will reduce evaporation in hot and dry climate, drought in the summer season and desert areas around the world and areas which lack of rainfall and suffer from depletion of underground water reservoir as a result of expansion in agriculture, farming, planting trees and forestry's.

The device when fully absorbed the irrigation water will permeate to supply and feed water to the roots in proximity to tree/plant by allowing diffusion of water from the device which help the said tree/plant to grow.

The necessity to find some solutions to participate and resolve this problem even in small scale by using irrigation water saver (the device) to reduce the amount at percentage from 20% to 30% of irrigation water.

Components of the Device (Irrigation Water Saver) in calculated rate of the raw material components according to the agriculture season:
  1. Rice Husk or Rice Shell
  2. Cotton Stalks
  3. Corn Stalks
  4. Bamboo
  5. Sawdust
  6. Tree Branches (as a substitute element in case the above mentioned raw materials from numbers 2 to 4 is not available).

The device which is made of crushed, mixed and dried biomass and combusted into cylinder shape at 8 cm./6 cm./4 cm. diameter in round and square shape with hallow inside. The device is free of chemicals and nematode and environmental friendly.

A method to use irrigation water saving device wherein the device reduce the amount of irrigation water for large trees, medium trees and plants, in order to minimize the problem of shortfall of water irrigation and to reduce a percentage from 20% to 30% of the consumption of water irrigation.

The method of reducing the amount of water used in irrigation of a tree/plant wherein by placing a water saving device into the ground under the source of water irrigation and in proximity around said tree/plant, supplying it with water through the device and wet and moisture surrounding soil, said device having greater water absorbing ability than the sandy soil thereby limiting the loss of water to the ground and maintaining a degree of moisture to said tree/plant by allowing diffusion of water from saturated said device to surrounding area.

The device will be inserted under large trees vertically within the range depth of 50 cm to 100 cm; medium trees (i.e. cotton, corn, pomegranate, banana, apple, orange, grape . . . etc) within the range depth of 25 cm to 50 cm; plants (i.e. lettuce, cabbage, tobacco, beans, peas, eggplant, chili, tomato . . . etc) within the range depth of 10 cm to 25 cm.

The size/length of the device is according to the size and age of the tree/plant.

Large trees, the size/length of the device is within the range of 25 cm or longer, medium trees within the range of 15 cm to 25 cm and plants within the range of 5 cm to 10 cm.

The numbers of the device required is according to the size and age of the tree/plant and the season: large trees at rate of 2 devices in winter and a minimum rate of 4 devices in summer; medium trees at a rate of 1 device in winter and a minimum rate of 2 devices in summer; plants at a minimum rate of 1 device in season.

What is claimed is:

1. A method of reducing the amount of water used in irrigation of a tree/plant comprising:
    placing an irrigation water saving device under a source of irrigation water into the ground near and in proximity to said tree/plant, wherein the device is made of mixed biomass of raw material components, in at least one of a round shape and a square shape with a dimension selected from the group consisting of 4 cm, 6 cm, and 8 cm in diameter, according to an agricultural season and is manufactured by crushing and mixing at a calculated rate, drying and then pressing the biomass into a cylinder shape that is hollow inside, said placing comprising placing the device at:
        a depth for a large tree up to 100 cm, a depth for a medium tree up to 50 cm, and a depth for a plant other than a large or a medium tree up to 25 cm;
        a length/size for a large tree of 25 cm or longer, a length/size for a medium tree up to 25 cm, and a length/size for a plant other than a large or medium tree up to 10 cm;
        a number for a large tree of 2 to 4 devices or more, a number for a medium tree of 1 to 2 devices, and a number for a plant other than a large or medium tree to a minimum of 1 device;
    wherein the method of reducing the amount of water used in irrigation wherein said device has a water absorbing ability up to 300%, which is greater than a water absorbing ability of sandy soil, such that when the device fully absorbs the water, the water then will permeate to said tree/plant through the sandy soil when a daily ration of irrigation stops and the sandy soil surrounding the device starts to get dry.

2. The method as claimed in claim 1 wherein the device reduces the amount of water used in irrigation of a tree/plant by placing said device under the source of irrigation water into the ground near and in proximity to the tree/plant within a range depth of 50 cm to 100 cm for large trees; placing said device under the source of irrigation water into the ground near and in proximity to the tree/plant within a range depth of 25 cm to 50 cm for medium trees; and placing said device under the source of irrigation water into the ground near and in proximity to the tree/plant within a range depth of 10 cm to 25 cm for plants other than large or medium trees.

3. The method as claimed in claim 1 wherein the device reduces the amount of water used in irrigation of a tree/plant by placing said device under the source of irrigation water into the ground near and in proximity to the tree/plant when the length of the device is 25 cm or longer for larger trees; reduces the amount of water used in irrigation of medium trees when the length of the device is within the range of 15 cm to 25 cm; reduces the amount of water used in irrigation of plants other than large or medium trees when the length of the device is within the range of 5 cm to 10 cm.

4. The method as claimed in claim 1 wherein the device reduces the amount of water used in irrigation of a tree/plant by placing 2 devices in winter and a minimum of 4 devices in summer under the source of irrigation water into the ground near and in proximity to the tree/plant for large trees; placing 1 device in winter and a minimum of 2 devices in summer for medium trees; and placing a minimum of 1 device in season for plants other than large or medium trees.

* * * * *